United States Patent [19]

Sakaki

[11] Patent Number: 4,725,908
[45] Date of Patent: Feb. 16, 1988

[54] MAGNETIC RECORDING APPARATUS

[75] Inventor: Teruo Sakaki, Furukawa, Japan

[73] Assignee: Alps Electric Co., Ltd., Japan

[21] Appl. No.: 70,107

[22] Filed: Jul. 6, 1987

Related U.S. Application Data

[63] Continuation-in-part of Ser. No. 726,077, Apr. 22, 1985, abandoned.

[30] Foreign Application Priority Data

Apr. 20, 1984 [JP] Japan .................................. 59-78681

[51] Int. Cl.⁴ ........................ G11B 5/147; G11B 21/12
[52] U.S. Cl. ........................................ 360/105; 360/126
[58] Field of Search .................. 360/126, 105, 119, 121

[56] References Cited

U.S. PATENT DOCUMENTS

| 4,251,842 | 2/1981 | Iwasaki et al. | 360/119 |
| 4,317,148 | 2/1982 | Chi | 360/119 |
| 4,320,426 | 3/1982 | Thompson | 360/105 |
| 4,423,449 | 12/1983 | Hasegawa | 360/105 |
| 4,443,826 | 4/1984 | Sawada et al. | 360/119 |

Primary Examiner—Robert S. Tupper
Attorney, Agent, or Firm—Guy W. Shoup

[57] ABSTRACT

A magnetic head for recording information on both sides of a magnetic medium utilizing perpendicular recording has two similar head blocks disposed opposite to each other. The magnetic medium having recording films on its both sides is placed between the two head blocks. Each of the blocks consists of an auxiliary magnetic pole, a main magnetic pole enclosed in the auxiliary pole, and a coil wound around the auxiliary pole.

10 Claims, 13 Drawing Figures

MAGNETIC RECORDING APPARATUS

This is a continuation-in-part application from application Ser. No. 726,077 filed Apr. 22, 1985, now abandoned.

FIELD OF THE INVENTION

The present invention relates to an apparatus capable of recording information on both sides of a magnetic medium by perpendicular magnetic recording.

BACKGROUND OF THE INVENTION

Heretofore, two kinds of magnetic heads have been proposed for perpendicular recording. One type of head uses auxiliary magnetic pole excitation as shown in FIG. 1 and the other type of head uses main magnetic pole excitation as shown in FIG. 2.

With either kind of head, it is required that a main magnetic pole 1 be close to or in contact with a perpendicular magnetization film 2 which constitutes a recording film. In the case of perpendicular recording, the proximity of the perpendicular magnetization film 2 to the main magnetic pole 1 creates a strong interaction, permitting recording on and reading of the recording film. (See Technical Report of IECE of Japan (1979).)

The flow of magnetic flux produced using a auxiliary magnetic pole exitation type of head during recording is shown in FIG. 3, where the vicinity of the auxiliary magnetic pole 5 is schematically shown. The direction in which the recording film is moved is indicated by arrow 7. The magnetic flux converges through internal magnetization film 3 to join around the front end of the main magnetic pole 1 thus recording on or reading the portions of the perpendicular magnetization film 2 lying closest to the front end. It is to be noted that the auxiliary magnetic pole 5 is located remotely from the recording film and that the magnetic flux density at its surface is small. Therefore, it is impossible to record or read information by using the auxiliary magnetic pole alone. Also shown in FIGS. 1–3 the substrate 4 for supporting a magnetic medium, and a coil 6.

A conventional magnetic head for recording information on both sides of a magnetic medium utilizing this perpendicular magnetic recording is shown in FIG. 4. This head is of the auxiliary magnetic pole excitation kind, and acts in such a way that information is written to, or read from, recording films 2-(1) and 3-(1) by the use of a main magnetic pole 1-(1), an auxiliary magnetic pole 5-(1), and a read/write coil 6-(1). When information is written to or read from the recording films 2-(2) and 3-(2), another main magnetic pole 1-(2), another auxiliary magnetic pole 5-(2), and another read/write coil 6-(2) are used. During these operations, it is unlikely that the recording films 2-(2) and 3-(2) will be overwritten by the magnetic field set up by the auxiliary magnetic pole 5-(1) or that information will be transferred from the recording films 2-(2) and 3-(2) to the auxiliary magnetic pole 5-(1), because perpendicular recording intrinsically relies on the interaction caused by proximity. The same situation applies to the auxiliary magnetic pole 5-(2) and the recording films 2-(1) and 3-(1).

The conventional structure as shown in FIG. 4 has as many as four magnetic poles 1-(1), 1-(2), 5-(1), and 5-(2) which are all required to be located relatively close to the magnetic medium. Accordingly, the head is very difficult to machine. Generally, magnetic heads utilizing vertical recording produce lower output signal levels than annular internal recording heads. To increase the output levels, the number of turns in the coil 6 is increased which consequently increase the volume occupied by the coil. This makes it difficult to manufacture the head compactly. In particular, each coil is wound on an auxiliary magnetic pole and so it is impossible to make the space between the auxiliary magnetic pole and the neighboring main magnetic pole less than the thickness of the wound coil. Hence, miniaturization of the head is difficult to attain. This difficulty also arises even if the recording film, which is the combination of the vertical magnetization film and the internal magnetization film as shown in FIGS. 1–4, is replaced by a single-layer film consisting only of a perpendicular magnetization film. Also, when four magnetic poles are provided, the magnetic recorder requires additional parts for precisely locating the recording medium and the four magnetic poles relative to each other.

SUMMARY OF THE INVENTION

It is a general object of the present invention to provide a magnetic recording apparatus which records information on both sides of a magnetic medium utilizing perpendicular recording and which is free of the difficulties associated with the aforementioned prior art apparatus.

More specifically it is an object of present invention to provide a magnetic recording apparatus which records information on both sides of a magnetic medium utilizing perpendicular recording and which is made up of a smaller number of components, is easy to machine and adjust, and can be manufactured compactly.

These objects are achieved by a magnetic recording apparatus in which two head blocks of the same structure are disposed opposite to each other with recording films therebetween, each of the head blocks consisting of a main magnetic pole and an auxiliary magnetic pole which are fabricated as a unit. An apparatus for moving the magnetic heads is provided with a carriage, a moving element capable of moving in a direction perpendicular to the recording medium, a first support arm holding a first magnetic head supported on the moving element, a second support arm holding a second magnetic head pivotally supported on the first support arm, and means for setting a preset gap between the first and second magnetic heads.

DETAILED DESCRIPTION OF THE INVENTION

Figure 1:
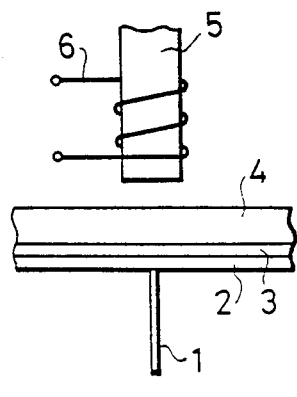
FIG. 1 is a front elevation of a magnetic head of the auxiliary magnetic pole exitation type utilizing perpendicular recording.
Figure 2:
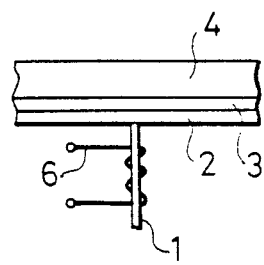
FIG. 2 is a front elevation of a magnetic head of the main magnetic pole exitation type utilizing perpendicular recording.

Some examples of magnetic recording apparatus according to the present invention, i.e., magnetic heads for recording information on both sides of a magnetic medium utilizing perpendicular recording, are hereinafter described. The magnetic media in the following examples generally have composite films, each of which consists of a perpendicular magnetization film and an internal magnetization film. The magnetic heads in the following examples are of the auxiliary magnetic pole excitation type. In FIGS. 5–11, the same or substantially the same components as those of FIGS. 1–4 are indicated by the same reference numerals as in FIGS. 1–4, but numeral 10, 20, 30, or 40 may or may not be added to them.

Figure 5:
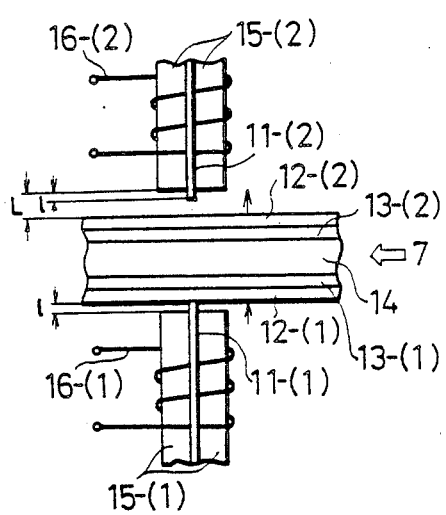
FIG. 5 is a front elevation of a magnetic recording apparatus according to the present invention, showing the manner in which information is written to, or read from, recording surfaces on one side.
Figure 6:
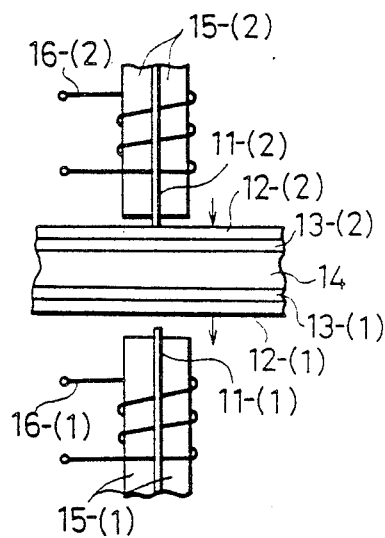
FIG. 6 is a view similar to FIG. 5 except that information is written to, or read from, recording surfaces on the other side.

Referring to FIGS. 5–6, a first perpendicular magnetization film 12-(1) and a first longitudinal magnetization film 13-(1) are formed on the lower side of a medium substrate 14 as viewed in the page. Formed on the upper side of the substrate are a second perpendicular magnetization film 12-(2) and a second longitudinal magnetization film 13-(2). These films act to record information. A first main magnetic pole 11-(1) is enclosed in a first auxiliary magnetic pole 15-(1) on the side of the recording films 12-(1) and 13-(1). A first coil 16-(1) is wound around the first auxiliary magnetic pole 15-(1). Similarly, a second main magnetic pole 11-(2) is enclosed in a second auxiliary magnetic pole 15-(2) on the side of the recording films 12-(2) and 13-(2). A second coil 16-(2) is wound around the second auxiliary magnetic pole 15-(2). FIG. 5 shows the manner in which information is written to, or read from, the recording films 12-(1) and 13-(1) by the structure described above. FIG. 6 shows the manner in which information is written to, or read from, the recording films 12-(2) and 13-(2) by the same structure.

In the example of FIGS. 5 and 6, the main magnetic pole 11-(1) or 11-(2) is enclosed in the auxiliary magnetic pole 15-(1) or 15-(2). Generally, the material of main magnetic poles is larger in magnetic permeability than auxiliary magnetic poles. There arise no problems, however, if main and auxiliary magnetic poles are fabricated as a unit. The main magnetic pole 11-(1) is so disposed that its center line is substantially aligned with the center line of the opposite head block which is composed of the auxiliary magnetic pole 15-(2), the main magnetic pole 11-(2), and the coil 16-(2). The main magnetic pole 11-2 is also disposed in the same relation to the opposite head block that is comprised of the auxiliary magnetic pole 15-(1), the main magnetic pole 11-(1), and the coil 16-(1).

Referring to FIG. 5, information can be written to, or read from, the recording films 12-(1) and 13-(1) by causing the main magnetic pole 11-(1) to come close to the vertical magnetization film 12-(1). At this time, the opposite head block consisting of the auxiliary magnetic pole 15-(2), the main magnetic pole 11-(2), and the coil 16-(2) is located away from the medium at the same position as the conventional auxiliary magnetic pole assumes. A signal is applied to the coil 16-(2) to excite the auxiliary magnetic pole, permitting the main magnetic pole 11-(1) to record information. When information is to be read out, the signal produced on the recording films 12-(1) and 13-(1) is detected by the main magnetic pole 11-(1), and the output signal is taken from the coil 16-(2) of the opposite head block. At this time, since the main magnetic pole 11-(2) is located sufficiently away from the other recording films 12-(2) and 13-(2), overwriting or other problems will not take place. Referring to FIG. 6, information can be written to, or read from, the recording films 12-(2) and 13-(2) in the same way as in the case of FIG. 5. Movement of the heads toward and away from the surface of the disk are indicated by the arrows in FIGS. 5 and 6.

Figure 3:
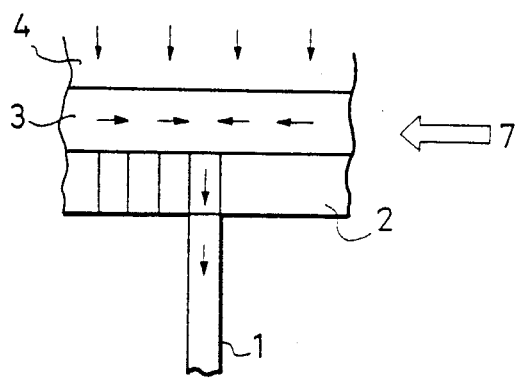
FIG. 3 is a diagram schematically showing the flow of magnetic flux in the magnetic head of the auxiliary magnetic pole excitation type during recording.
Figure 4:
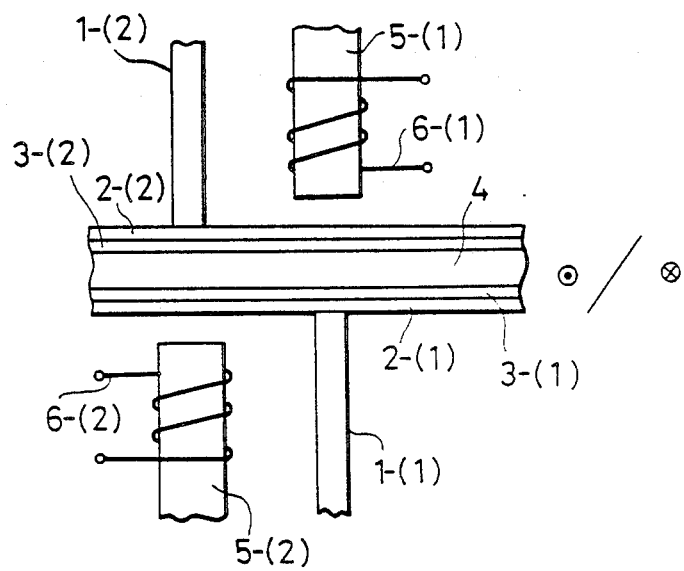
FIG. 4 is a front elevation of a conventional magnetic recording apparatus.

The flow of magnetic flux which is produced by the example of FIG. 5 during recording is next described briefly in the same fashion as in FIG. 3. The distance l between the protruding end of the main magnetic pole 11-(2) and the end surface of the auxiliary magnetic pole 15-(2) is much less than the distance L between the end of the vertical magnetization film 12-(2) and the end of the auxiliary magnetic pole 15-(2), i.e., $l << L$. Therefore, the magnetic line of force can be assumed to issue uniformly from the end surface of the auxiliary magnetic pole 15-(2). On the side which is in contact with the vertical magnetization film 12-(1), there is a distance of l between the protruding end of the main magnetic pole 11-(1) and the end surface of the auxiliary magnetic pole 15-(1). Accordingly, the magnetic line of force issuing from the auxiliary magnetic pole 15-(2) is concentrated on the main magnetic pole 11-(1) that is in contact with the vertical magnetization film 12-(1).

Figure 7:
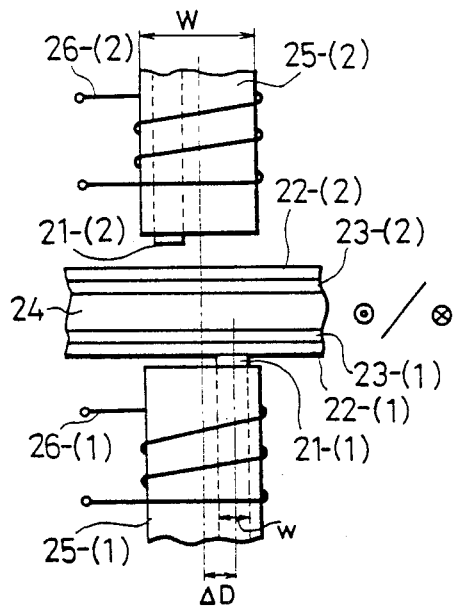
FIG. 7 is a front elevation of another magnetic recording apparatus according to the invention.

Referring next to FIG. 7, there is shown another example of the invention. In this example, the centers of main magnetic poles 21-(1) and 21-(2) are offset relative to each other in direction of the face of the medium which is perpendicular to the direction of the movement of the medium indicated by $\odot$ or $\otimes$. Information is written to, or read from, recording films 22-(1) and 23-(1).

Figure 8:
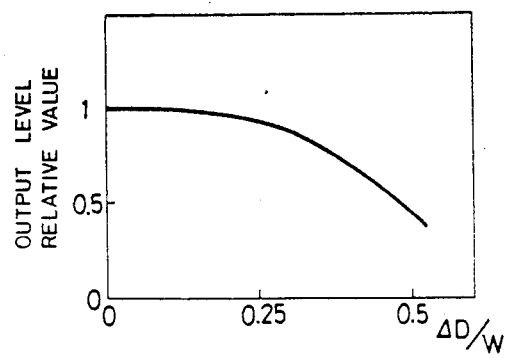
FIG. 8 is a graph showing the characteristic output level delivered from the apparatus of FIG. 7 versus ΔD/w.
Figure 9:
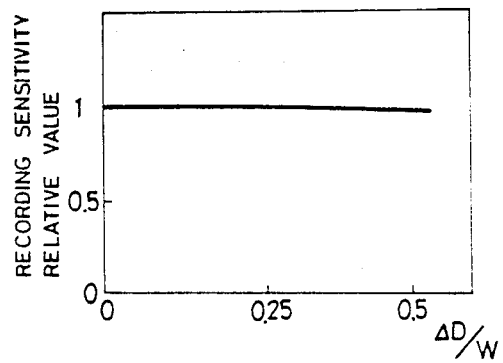
FIG. 9 is a graph showing the characteristic recording sensitivity of the apparatus of FIG. 7 versus ΔD/w.

FIGS. 8 and 9 show the results of measurements made on the output level and the recording sensitivity, respectively, when the main magnetic pole 21-(1) is disposed in an offset relation to the opposite head block which is composed of an auxiliary magnetic pole 25-(2), the main magnetic pole 21-(2), and a coil 26-(2). In these figures, W denotes the width of the auxiliary magnetic pole, w indicates the width of the main magnetic pole, and ΔD stands for the distance between the center of the main magnetic pole and the center of the auxiliary magnetic pole when measured along the face of the medium. These graphs show that the recording sensitivity and the output level in this example are maintained constant until ΔD/w nearly reaches 0.25.

More specifically, when ΔD is substantially equal to 0, the center line of the main magnetic pole 21-(1) is substantially aligned with the center line of the auxiliary magnetic pole 25-(2) and so the uniform magnetic field which is developed from the auxiliary magnetic pole 25-(2) in vertical relation to the face of the medium is concentrated on the main magnetic pole 21-(1). The result is that the recording sensitivity and the output level are maximized. When ΔD is increased, the magnetic flux is concentrated around the front end of the main magnetic pole 21-(1) which is in contact with the medium, but the degree of concentration of the magnetic flux on the front end is considered to be less than that obtained when ΔD≃0, because the main magnetic pole 21-(1) enters the end of the auxiliary magnetic pole 25-(2). Essentially, the magnetic field at the end of the auxiliary magnetic field leaks more to the surroundings and is less uniform than the magnetic field at the center. However, when the main magnetic pole is placed in the uniform magnetic field that is generated by the auxiliary magnetic field and perpendicular to the face of the medium, even if the centers of the main and auxiliary magnetic poles are not aligned with each other, the resulting output level and recording sensitivity are not affected by such a misalignment. That is, the same performance is obtained as in the case of the alignment, i.e., ΔD=0.

Although the recording films are composite films each consisting of a perpendicular magnetization film and an longitudinal magnetization film in FIGS. 5–9, use of a single-layer film consisting only of a perpendicular magnetization film will produce the same result. Also, the magnetic head is of the auxiliary magnetic pole excitation type in the present embodiment, but, as can be seen by the comparison between FIG. 2 and FIG. 5, it may be operated as a head of the main magnetic pole excitation type provided with image cores (11-(2) and 15-(2) in the case of FIG. 5) as the need arises. In addition, it may be possible that it is operated as a head of the auxiliary magnetic pole excitation type during recording and as a head of the main magnetic pole excitation type, or vice versa.

Figure 10:
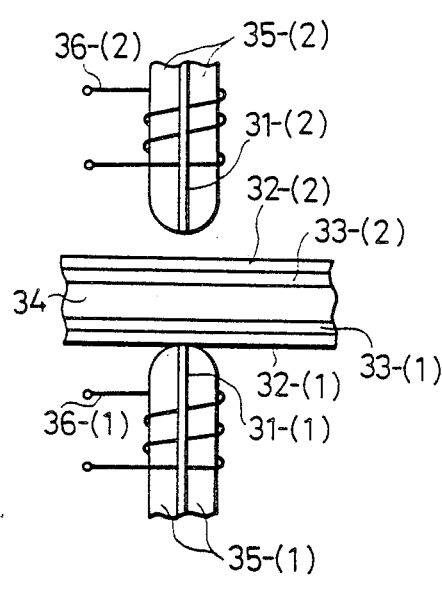
FIGS. 10 and 11 are front elevations of still other magnetic recording apparatuses according the invention.
Figure 11:
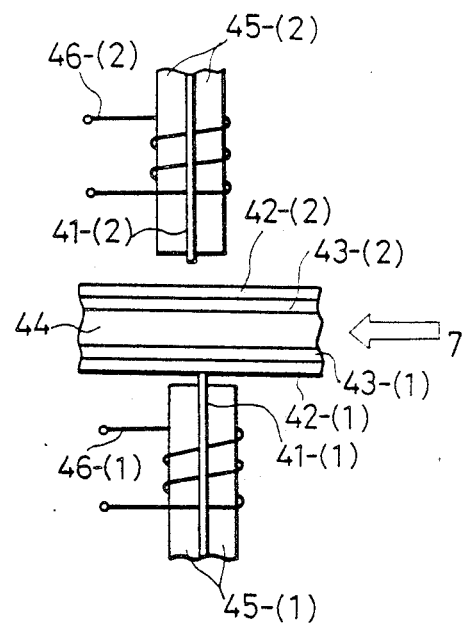

Referring next to FIGS. 10 and 11, there are shown still other examples of the invention. In the structure of FIG. 10, main magnetic poles 31-(1) and 31-(2) are aligned with each other, and the front ends of auxiliary magnetic poles 35-(1) and 35-(2) are aligned with each other. In the structure of FIG. 11, opposite head blocks are offset relative to each other in the direction of the movement of the medium.

Figure 12:
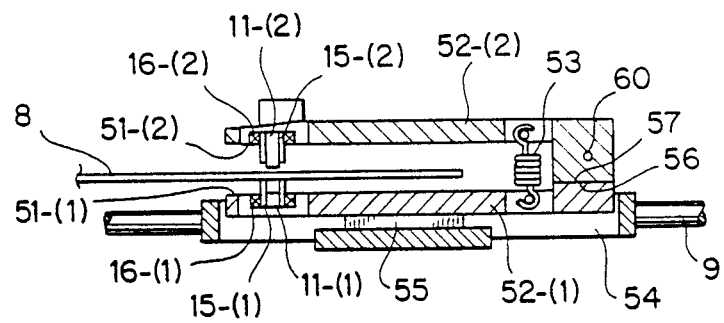
FIGS. 12 and 13 are side and front views of a magnetic head moving apparatus for carrying out magnetic recording according to the invention.
Figure 13:
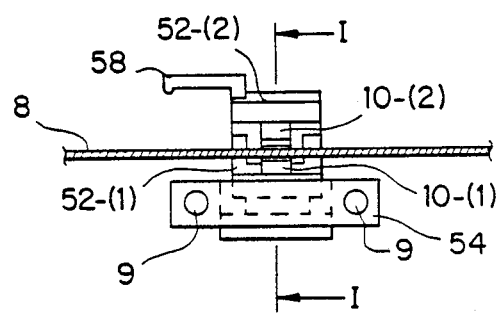

Referring to FIGS. 12 and 13, an apparatus for moving the magnetic heads as described hereinabove is shown having guide shafts 9, a carriage 54 slidably supported on the guide shafts 9, a piezoelectric element 55 mounted on the carriage 54, a first support arm 52-(1), namely, a lower support arm supported on the piezoelectric element 55, a second support arm 52-(2), namely, an upper support arm, pivotally joined to the first support arm 52-(1), a first magnetic head attached to the free end 51-(1) of the first support arm 52-(1), and a second magnetic head attached to the free end 51-(2) of the second support arm 52-(2), wherein the two magnetic heads are disposed on opposite sides of the magnetic disk recording medium 8. As described previously, the first magnetic head consists of first main magnetic pole 11-(1) and first auxiliary magnetic pole 15-(1), and the second magnetic head consists of second main magnetic pole 11-(2) and second auxiliary magnetic pole 15-(2).

The carriage 54 is driven laterally on the guide shafts 9 in either direction in order to move the magnetic heads radially of the disk 8. The piezoelectric element 55 mounted on the carriage 54 may be made, for example, of a plate-shaped ceramic member of BaTiO (barium titanate). Electrodes (not shown) are attached to the opposite end faces of the ceramic piezoelectric element 55 to apply a voltage supplied by a controller (not shown) corresponding to a desired expansion or contraction of the element. The first support arm 52-(1) is attached to the upper surface of the piezoelectric element 55.

The second support arm 52-(2) is supported pivotally on a pin 60 at one end of the first support arm beyond the outer circumference of the disk 8. The first and second support arms are urged toward each other by an extension spring 53. The disposition of the two support arms relative to each other is defined by a gap which is set by the abutment of gap defining surface 56 on the upper surface of the base end of first support arm 52-(1) and gap defining surface 57 on the lower surface of the base end of second support arm 52-(2) which extend substantially parallel to the guide shafts 9.

The first and second magnetic heads are secured to the respective free ends of the two support arms, so as to be located on opposite sides of the magnetic disk. The defined gap between the magnetic heads is maintained for recording and reproducing operations.

The manner of recording and reproducing operations of the head moving assembly will be described hereinafter.

When the magnetic disk 8 is not loaded in the recording apparatus, an actuating mechanism (not shown) engages the arm 58 projecting laterally from the upper side of the second support arm 52-(2) to pivot the second support arm upward on the pin 60 so that the second magnetic head 11-(2) is lifted away from the first magnetic head 11-(1). Once the magnetic disk 8 has been loaded in the recording apparatus, the actuating mechanism releases the arm 58 so that the second support arm 52-(2) is pivoted downward toward the first support arm 52-(1) by the extension spring 53. The downward movement is limited by the abutment of the gap defining surfaces 56,57 at the base ends of the support arms so as to locate the second magnetic head a fixed distance corresponding to the preset gap opposite the first magnetic head.

A controller (not shown) for the recording apparatus provides a signal for seeking a desired track on the disk 8, and the carriage 54 is driven laterally to bring the heads to the target track. Then, a side selection signal is given indicating the side of the disk 8 which is selected for a recording or reproducing operation. For example, if the lower side of disk 8 is selected, the controller applies an appropriate voltage to the electrodes for the piezoelectric element 55 to expand so as to move the first main magnetic pole 11-(1) perpendicularly close to the lower surface of the disk 8 to a predetermined position (see FIG. 5), wherein the recording or reproducing operation is implemented. If the upper side of disk 8 is selected, the controller applies a voltage to the electrodes for the piezoelectric element 55 to contract so as to move the second main magnetic pole 11-(2) perpendicularly close to the upper surface of the disk 8 (see FIG. 6).

The relation between the expansion and contraction of the piezoelectric element and the voltages to be applied is programmed so that the positioning of the magnetic heads can be controlled precisely. In practice, the maximum expansion and contraction of the piezoelectric element for the recording apparatus is in the range of about 0.25 mm. Since the expansion or contraction of the piezoelectric element does not affect the recording medium magnetically, the recording and reproducing operations can be carried out without any trouble.

Alternatively, the element 55 may be a shape memory alloy element, which expands and contracts according to temperature. The relation of expansion and contraction to temperature is determined beforehand and used to control heating means, for example, a heating element wound around the shape memory alloy element.

The examples described above make use of the essential property of the perpendicular magnetic recording which is based on the strong interaction that is caused by the condition in which a mian magnetic pole and a recording film are in close proximity to each other or in contact with each other. Therefore, the invention can be embodied in every application as long as the foregoing requirement is satisfied.

It is also possible to place a nonmagnetic spacer between an auxiliary magnetic pole and the medium. Lubrication may be imparted to the spacer to stabilize the movement. Additionally, a thin nonmagnetic layer may be interposed between a main magnetic pole and a recording surface to protect the medium and for lubricating purposes. In this case, the interaction is weaker than the case where a main magnetic pole and a recording surface are in contact with each other, but it can be embodied in a fixed magnetic disk apparatus without creating any problem.

As thus far described, the novel magnetic head according to the invention is achieved simply by disposing a pair of head blocks in opposite relation to each other. Hence, the machining and adjusting operations needed for the head are halved as compared with the conventional head. Also, since no coil is mounted between a main magnetic pole and an auxiliary magnetic pole, the distance between two opposite magnetic poles can be set to any desired value, thus permitting a compact device for double-sided perpendicular magnetic recording.

What is claimed is:

1. In a magnetic recording apparatus for recording information on a magnetic disk of the type utilizing a carriage having upper and lower support portions between which the disk is inserted, a pair of magnetic pole structures each mounted on a respective support portion of the carriage on a respective side of the disk, and means mounted on the carriage and connected to the support portions for selectively moving the respective magnetic pole structures toward and away from the disk to carry out perpendicular recording,
    an improvement for perpendicular recording on both sides of the disk comprising:
    only two head blocks both having the same structure disposed opposite to each other with the disk interposed therebetween and movable towards and away from the respective surfaces of the disk, said head blocks each having a main magnetic pole enclosed in an auxiliary magnetic pole and a coil around the auxiliary magnetic pole, said main magnetic pole having an end projecting a small amount beyond an end of said auxiliary magnetic pole in the direction toward the disk, whereby when it is desired to record information on one side of the disk, the head block on the one side is moved so as to place the end of the main magnetic pole close to the corresponding surface of the disk to permit the main magnetic pole to record information.

2. A magnetic recording apparatus as set forth in claim 1, wherein the head blocks of the same structure are disposed opposite to each other with the recording films therebetween such that the center line of one of the two head blocks is substantially aligned with the center line of the other.

3. A magnetic recording apparatus as set forth in claim 1, wherein the head blocks of the same structure are disposed opposite to each other with the recording films therebetween such that the center line of the two head blocks are offset relative to the center line of the other.

4. A magnetic recording apparatus according to claim 1, wherein when said head block on the one side is moved close to the disk, the head block on the other side is moved away from the disk and a signal is applied to the coil of said head block on the other side to effect perpendicular recording of the auxiliary magnetic pole excitation type in conjunction with said main magnetic pole of said head block on the one side.

5. In a method for recording information on a magnetic disk of the type utilizing a carriage having upper and lower support portions between which the disk is inserted, a pair of magnetic pole structures each mounted on a respective support portion of the carriage on a respective side of the disk, and means mounted on the carriage and connected to the support portions for selectively moving the respective magnetic pole structures toward and away from the disk to carry out perpendicular recording,
    an improvement for perpendicular recording on both sides of the disk comprising the steps of providing only two head blocks both having the same structure disposed opposite to each other with the disk interposed therebetween and movable towards and away from the respective surfaces of the disk, said head blocks each having a main magnetic pole enclosed in an auxiliary magnetic pole and a coil around the auxiliary magnetic pole, said main magnetic pole having an end projecting a small amount beyond an end of said auxiliary magnetic pole in the direction toward the disk, and when it is desired to record information on one side of the disk, moving the head block on the one side so as to place the end of the main magnetic pole close to the corresponding surface of the disk to permit the main magnetic pole to record information.

6. A magnetic recording method according to claim 5, further comprising the step of moving the head block on the other side away from the disk when said head block on the one side in moved close to the disk, and applying a signal to the coil of said head block on the other side to effect perpendicular recording of the auxiliary magnetic pole excitation type in conjunction with said main magnetic pole of said head block on the one side.

7. A perpendicular magnetic recording apparatus employing first and second magnetic heads disposed on opposite sides of a magnetic recording medium, each magnetic head being integrally formed with a main magnetic pole and an auxiliary magnetic pole, comprising:
    a carriage movably supported on guide support means for movement along a horizontal direction parallel to the sides of the magnetic recording medium;
    a constrictive element mounted on the carriage and capable of expanding and contracting in a vertical direction perpendicular to the sides of the magnetic recording medium;

a first support arm mounted on said constrictive element and having one end on which said first magnetic head is mounted facing one side of the magnetic recording medium;

a second support arm having one end on which said second magnetic head is mounted facing the other side of the magnetic recording medium, wherein the other end of said second support arm is pivotably mounted to the other end of said first support arm;

gap defining means formed on said first and second support arms for setting a predetermined gap between said first and second magnetic heads; and means for biasing said second support arm toward said first support arm to bring said second and first magnetic heads opposite each other by said predetermined gap, whereby when it is desired to record information on a selected side of the magnetic recording medium, said constrictive element is expanded or contracted so as to move the first and second support arms together in one or the other perpendicular direction and to place the corresponding magnetic head on a respective one of the support arms close to the selected side of the magnetic recording medium to record information thereon.

8. A perpendicular magnetic recording apparatus according to claim 7, wherein said constrictive element is a piezoelectric element which is capable of expanding or contracting in response to a voltage applied thereto by a control means.

9. A perpendicular magnetic recording apparatus according to claim 7, wherein said constrictive element is a shape memory alloy element which is capable of expanding or contracting in response to heat applied thereto by a control means.

10. A perpendicular magnetic recording apparatus according to claim 7, wherein said first and second magnetic heads are each comprised of a main magnetic pole enclosed in an auxiliary magnetic pole and a coil around the auxiliary magnetic pole, said main magnetic pole having an end projecting a small amount beyond an end of said auxiliary magnetic pole in the direction toward the magnetic recording medium.

* * * * *